Figure 1:
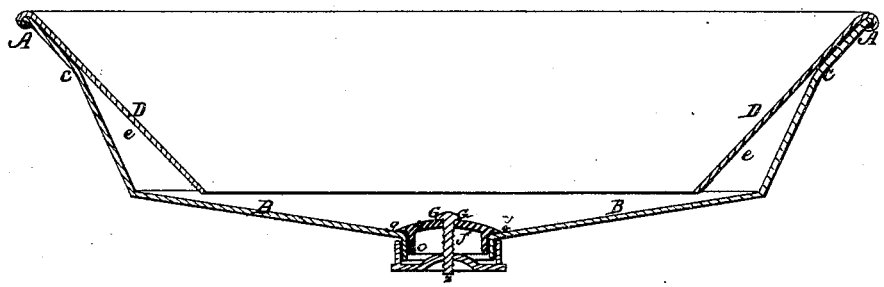

T. KENDALL, Sr.
GOLD MINER'S WASHING PAN.

No. 37,758.                     Patented Feb. 24, 1863.

UNITED STATES PATENT OFFICE.

THOMAS KENDALL, SR., OF SAN FRANCISCO, CALIFORNIA.

IMPROVED GOLD-MINER'S WASHING-PAN.

Specification forming part of Letters Patent No. 37,758, dated February 24, 1863.

*To all whom it may concern:*

Be it known that I, THOMAS KENDALL, Sr., of the city and county of San Francisco, State of California, have invented a new and improved gold-miner's washing-pan, for preventing the great loss of quicksilver and fine gold, and also a saving of labor and time in the washing of fine gold from what is now experienced in the washing thereof by all pans now in use; and I do declare the following to be a full and exact description of my invention.

This improved pan and invention is to be called "Kendall's paragon gold-saver."

The principle of my invention consists in making for the fine gold and quicksilver a pocket or trap, so that when it has settled to the bottom it cannot possibly get out again, except by a place specially provided for that purpose; nor can the pan be held in any position by which the gold and quicksilver can escape except by the special provision mentioned, and hereinafter more particularly described.

I first make, of sheet-iron or any other metal or wood, pan A. The pan can be constructed of any known size or shape. The drawing I have made (half size) is of the size and shape of the American gold-mining pan, sixteen inches in diameter at top of pan by three inches and one-half deep, with sides contracting to a bottom, (marked B,) which bottom is eleven inches in diameter. These sides, contracting distant two and one-half inches from the bottom of the pan, have an internal miter, C, about one-quarter of an inch, projecting into the inside of the pan A. This or bevel in miter C is to correspond with an inner pan, (marked D,) which is also sixteen inches, at the top of pan, in diameter, to correspond and fit with outside pan, A, and miter C. The inner pan, D, is without any bottom, and the opening where bottom would be if attached is nine inches in diameter, and a straight bevel from there to the top of said pan D. The inner pan, D, descends toward the bottom of pan A to within one-quarter of an inch of bottom B of pan A, leaving free passage of gold and quicksilver to pass into the pocket and out of it. (Pocket, marked E, formed by the junction of pan A and D at C.) The two pans A and D are brought together and turned over together at top, which binds them securely together. No wire is needed or employed. The bottom of pan A has its bottom B concave, about three-eighths of an inch, to allow quicksilver, gold, and sand to run to the center of the pan so it will not lodge under the pocket E in bottom of pan A. (Marked B.) In the bottom of pan A (marked B) in the center is a coupling, (marked G,) with its male and female parts F and O made of cast-iron, of about one inch and one-half diameter, with a screw, Z, descending from F to O from part of coupling F and screwing into coupling O—screw about three-fourths of an inch long. The couplings F and O are prepared with packings, (marked V,) so that when screwed together they grip the bottom of pan A—both the inner and outer sides of pan A—and therefore cause no strain on bottom B. This coupling is for the purpose of taking out the gold and quicksilver when wanted out. These pans can be made with a seam in the ordinary way, or pressed without a seam.

I hereby declare the foregoing and following description and operation of the said pan to be a full and exact description of the same, reference being made to the annexed drawings, making them a part of the specification.

Figure 2:
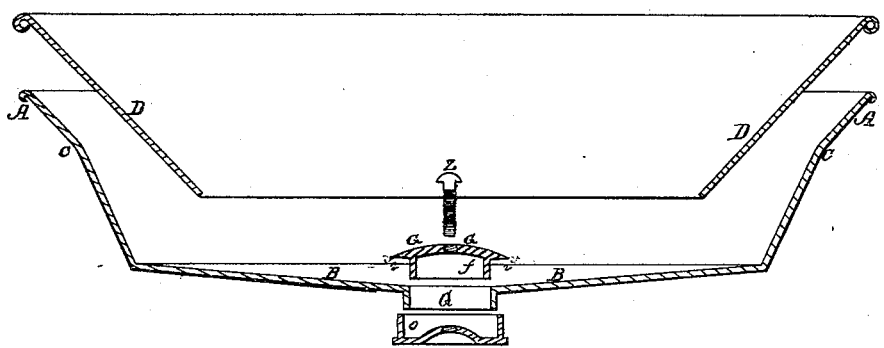

Figure 1 is a diagonal view of the pan complete in working order with its outside pan, A, and concave bottom B, and its internal miter C and pocket E, with the coupling G, with its parts F and O and screw Z and inside pan, D, without its bottom; also, packing V. Fig. 2 shows also diagonal view of the inner pan, D, without its bottom. Fig. 3 shows outside pan, A, with concave bottom B, with its circular hole to receive couplings G and its flanges or miter C; also, showing coupling G, with the parts F and O, with packings V, and screw Z.

These pans can be made of any size required, and to hold any quantity of quicksilver needed. The inner pan, D, can have a section riveted tight down to outside pan, A, which will leave a place to turn out the quicksilver and gold, and no opening or coupling in bottom B will be needed to take out the quicksilver and gold, as it will leave a section of the pan without a pocket. Therefore the inner pan, D, will not be round if such section is riveted.

What I claim as my invention, and desire to secure by Letters Patent, is—

The pocket E, as formed and made by pans A and D and coupling G, with its parts F and O and packing V, with screw Z, in combination, as constructed and arranged, and substantially described herein.

THOMAS KENDALL, Sr.

Witnesses:
J. C. STEBBINS,
WM. H. CULVER.